United States Patent [19]

Minjolle et al.

[11] 4,410,636

[45] Oct. 18, 1983

[54] METHOD OF MANUFACTURING A SINTERED MATERIAL BASED ON SILICON NITRIDE, AND MATERIAL OBTAINED BY THE METHOD

[75] Inventors: Louis Minjolle, Tarbes; Serge Chateigner, Rabastens de Bigorre, both of France

[73] Assignee: Societe Anonyme Dite: Ceraver, Paris, France

[21] Appl. No.: 447,556

[22] Filed: Dec. 7, 1982

[30] Foreign Application Priority Data

Dec. 8, 1981 [FR] France ................................ 81 22912

[51] Int. Cl.³ .............................................. C04B 35/58
[52] U.S. Cl. ....................................... 501/98; 264/65; 501/152
[58] Field of Search ........................... 501/97, 98, 152; 264/65

[56] References Cited

U.S. PATENT DOCUMENTS

| | | | |
|---|---|---|---|
| 4,046,580 | 9/1977 | Ishii et al. | 501/98 |
| 4,143,107 | 3/1979 | Ishii et al. | 501/98 |
| 4,147,759 | 4/1979 | Demit | 501/97 |
| 4,184,884 | 1/1980 | Jong | 501/98 |
| 4,243,621 | 1/1981 | Mori et al. | 264/65 |
| 4,285,895 | 8/1981 | Mangels et al. | 501/98 |
| 4,323,323 | 4/1982 | Lumby et al. | 501/98 |
| 4,331,772 | 5/1982 | Torre et al. | 501/97 |
| 4,341,874 | 7/1982 | Nishida et al. | 501/98 |
| 4,346,147 | 8/1982 | Barlier et al. | 264/65 |

FOREIGN PATENT DOCUMENTS

| | | |
|---|---|---|
| 2010913 | 7/1979 | United Kingdom . |
| 2011952 | 7/1979 | United Kingdom . |
| 2063302 | 6/1981 | United Kingdom . |
| 1602821 | 11/1981 | United Kingdom . |

OTHER PUBLICATIONS

Chemical Abstracts, vol. 91, No. 4, Jul. 23, 1979, p. 160, abridgement 23395a (corresponding to Japanese patent application 79 25 299).

*Primary Examiner*—Helen M. McCarthy
*Attorney, Agent, or Firm*—Sughrue, Mion, Zinn, Macpeak and Seas

[57] ABSTRACT

A silicon nitride material is obtained by natural sintering in the presence of a small quantity of yttrium oxide. The method comprises the steps of mixing silicon powder with relatively small quantities of aluminum powder and yttrium oxide powder, nitriding the mixture of powders, re-crushing the nitrided mixture of powders, shaping the re-crushed powders, and then sintering the shaped re-crushed powders.

9 Claims, No Drawings

METHOD OF MANUFACTURING A SINTERED MATERIAL BASED ON SILICON NITRIDE, AND MATERIAL OBTAINED BY THE METHOD

The present invention relates to a method of manufacturing sintered material based on silicon nitride, by natural sintering in the presence of a small quantity of yttrium oxide.

The invention also relates to sintered material obtained by the method.

BACKGROUND OF THE INVENTION

Proposals have already been made to manufacture objects based on silicon nitride by sintering a silicon nitride powder to which sintering aids such as yttrium or magnesium oxide have been added. However, silicon nitride powder is extremely expensive and is difficult to obtain in the pure state. To perform natural sintering without recourse to hot pressing, the starting powder must be very fine, which increases the risk of oxidation by the oxygen in the air and of dissolution in the water with which it comes into contact during processing. Once oxidised the powder becomes difficult, and in some cases impossible, to sinter.

Proposals have also been made in French published patent specification No. 2 353 503 to manufacture an oxynitride of silicon and aluminum of the so-called SiAlON type, by nitriding and sintering a mixture of aluminum powder, silicon powder and alumina powder to form an intermediate product, by crushing the powdered intermediate product with powdered silicon nitride and a small quantity of sintering additive such as magnesia, and finally by sintering the mixture to produce a dense ceramic product. After nitriding such a method gives an intermediate product which is very difficult to re-crush, and it does not provide a sintered material whose composition is close to that of silicon nitride, but rather one which is rich in aluminum and contains a notable quantity of oxygen.

SUMMARY OF THE INVENTION

The present invention provides a method of manufacturing a sintered material based on silicon nitride, said material being obtained by natural sintering in the presence of a small quantity of yttrium oxide, wherein the method comprises the steps of:

mixing silicon powder with relatively small quantities of aluminum powder and yttrium oxide powder;
substantially totally nitriding the mixture of powders;
re-crushing the nitrided mixture of powders;
shaping the re-crushed powders; and
sintering the shaped re-crushed powders.

Preferably the method includes at least one of the following features:

the initial mixture of silicon, aluminum and yttrium oxide powders is prepared by suspending the powders in a solvent, then concentrating the suspension by centrifuging, and then drying it;

the mixture of powders suspended in the solvent is crushed using alumina balls;

the initial nitriding is performed in the presence of a gas which is rich in nitrogen and to which a small quantity of carbon oxide has been added;

the carbon oxide is obtained by performing the nitriding in a graphite furnace;

the initial nitriding is performed by heating the mixture of powders to a temperature in the range 1300° C. to 1450° C. for a period of six hours;

the mixture of nitrided powders is crushed until the average particle size is less than one micron; and the crushing takes place in an aqueous medium using steel balls.

The invention also provides a sintered material obtained by the above-defined method, said material comprising a crystaline phase having crystal parameters close to those of beta silicon nitride, and a vitreous phase rich in yttrium oxide, the combination of the two phases comprising a mixture of silicon nitride and aluminum nitride with 90% to 100% by weight silicon nitride, and 0% to 10% aluminum nitride, together with 1% to 10% yttrium oxide by weight relative to the total weight of the nitrides.

DESCRIPTION OF EXAMPLES

Methods of preparing material based on silicon nitride in accordance with the invention are described by way of example.

EXAMPLE 1

83 parts by weight of silicon powder are wet mixed with 5 parts aluminum powder and 12 parts yttrium oxide powder. The mixing takes place in a solvent such as hexane or heptane, and may be performed by simply mixing the liquids together, additionally the mixed liquids may be passed through a crusher filled with balls of alumina. The resulting slip is concentrated in a centrifuge and then dried.

The mixture of powders is placed in a graphite induction furnace under a nitrogen atmosphere and raised to a temperature of 1350° C. to 1400° C. The graphite walls give off a small concentration of carbon monoxide in the nitriding gas, thereby accelerating the rate at which the mixture of powders is nitrided because of the evaporation of the silicon monoxide SiO formed from the partial oxidation of the silicon.

After at least six hours nitriding at 1350° C. to 1400° C., the resulting powder is practically unaffected by water and acids.

The powder is crushed in aqueous medium using steel balls until the average particle size is less than 1 micron, eg. around 0.5 microns. The powder is then purified with the traces of iron from the crushing being removed by dilute hydrochloric acid, is then washed in water, and dried by centrifuging and then baking.

The powder is then shaped using conventional ceramic techniques such as pressing, extrusion, casting, injection, etc. It is then sintered by 15 hours of heat treatment at a temperature of more than 1600° C., preferably under an atmosphere of nitrogen or an atmosphere which is rich in nitrogen.

This produces an end product in which the specific mass is greater than 95% of the theoretical specific mass, and which is constituted by nitrides of silicon and aluminum with a little added yttrium oxide.

EXAMPLE 2

89 parts by weight silicon powder are mixed with 6 parts aluminum powder and 5 parts yttrium oxide powder as in Example 1, and the same operations are then performed as in Example 1. After nitriding, crushing the nitrided powder, and sintering shaped parts, the specific mass is again greater than 95% of the theoretical specific mass.

Although the examples given above are thought to be the best implementations of the invention, it will be understood that various modifications can be made thereto without departing from the scope of the invention. In particular, the initial wet mixing of the powders could be replaced by dry mixing. A gas free from oxides of carbon could be used for nitriding, even though carbon monoxide helps the nitriding process. The nitriding gas may contain a rare gas in addition to nitrogen.

We claim:

1. A method of manufacturing a silicon nitride based material, said material being obtained by natural sintering in the presence of a small quantity of yttrium oxide, the improvement wherein the method consists essentially of the steps of:
    mixing silicon powder with relatively small quantities of aluminum powder and yttrium oxide powder;
    substantially totally nitriding the mixture of powders;
    re-crushing the nitrided mixture of powders;
    shaping the re-crushed powders; and
    sintering the shaped re-crushed powders in a nitrogen atmosphere.

2. A method according to claim 1, wherein the initial mixture of silicon aluminum and yttrium oxide powders is prepared by suspending the powders in a solvent, then concentrating the suspension by centrifuging, and then drying it.

3. A method according to claim 2, wherein the mixture of powders suspended in the solvent is crushed using alumina balls.

4. A method according to claim 1, wherein the initial nitriding is performed in the presence of a gas which is rich in nitrogen and to which a small quantity of carbon oxide has been added.

5. A method according to claim 4, wherein the carbon oxide is obtained by performing the nitriding in a graphite furnace.

6. A method according to claim 1, wherein the initial nitriding is performed by heating the mixture of powders to a temperature in the range of 1300° C. to 1450° C. for a period of six hours.

7. A method according to claim 1, wherein the mixture of nitrided powders is crushed until the average particle size is less than 1 micron.

8. A method according to claim 7, wherein the crushing takes place in an aqueous medium using steel balls.

9. A silicon nitride based sintered material of specific mass greater than 95% of the theretical specific mass obtained by natural sintering in the presence of a small quantity of yttrium oxide according to the method comprising the steps of:
    mixing silicon powder with relatively small quantities of aluminum powder and yttrium oxide powder;
    substantially totally nitriding the mixture of powders;
    re-crushing the nitrided mixture of powders;
    shaping the re-crushed powders; and
    sintering the shaped re-crushed powders in a nitrogen atmosphere;
    and wherein said material consists essentially of a crystaline phase having crystal parameters close to those of beta silicon nitride, and a vitreous phase rich in yttrium oxide, the combination of the two phases consisting essentially of a mixture of silicon nitride and aluminum nitride with 90% to 100% by weight silicon nitride, and 0% to 10% aluminum nitride, together with 1% to 10% yttrium oxide by weight relative to the total weight of the nitrides.

* * * * *